(12) United States Patent
Schroeder et al.

(10) Patent No.: US 9,416,708 B2
(45) Date of Patent: Aug. 16, 2016

(54) METHOD FOR DETERMINING HC-CONVERSION EFFICIENCY OF A CATALYST, A DIAGNOSTIC DEVICE CONFIGURED TO CARRY OUT THE METHOD AS WELL AS A MOTOR VEHICLE HAVING SUCH A CATALYST

(71) Applicant: Volkswagen Aktiengesellschaft, Wolfsburg (DE)

(72) Inventors: Christfried Schroeder, Meinersen (DE); Michael Daetz, Tiddische (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 14/314,245

(22) Filed: Jun. 25, 2014

(65) Prior Publication Data

US 2014/0373510 A1  Dec. 25, 2014

(30) Foreign Application Priority Data

Jun. 25, 2013  (DE) .................... 10 2013 010 562

(51) Int. Cl.
*F01N 3/00* (2006.01)
*F01N 3/02* (2006.01)
(Continued)

(52) U.S. Cl.
CPC .............. *F01N 3/106* (2013.01); *F01N 11/007* (2013.01); *F01N 13/009* (2014.06); *F01N 13/0097* (2014.06); *F01N 3/021* (2013.01); *F01N 3/2066* (2013.01); *F01N 2550/02* (2013.01);
(Continued)

(58) Field of Classification Search
USPC .................... 60/274, 277, 286, 295, 299–301
See application file for complete search history.

(56) References Cited

U.S. PATENT DOCUMENTS

| | | | | |
|---|---|---|---|---|
| 5,157,921 | A | * 10/1992 | Ito et al. | ........................ 60/274 |
| 8,074,441 | B2 | * 12/2011 | Fujiwara | ............... F01N 11/007 |
| | | | | 60/276 |
| 2005/0188679 | A1 | 9/2005 | Miura | |

FOREIGN PATENT DOCUMENTS

DE    10 2005 056 312 A1    6/2006
DE    10 2007 012 701 A1    9/2008
(Continued)

OTHER PUBLICATIONS

German Search Report for German Application No. DE 10 2013 010 562.5, dated Jan. 24, 2014.

*Primary Examiner* — Jesse Bogue
*Assistant Examiner* — Dapinder Singh
(74) *Attorney, Agent, or Firm* — Pearl Cohen Zedek Latzer Baratz LLP (57) ABSTRACT

The invention relates to a method to determine the HC-conversion efficiency of a catalyst, which is situated in the exhaust gas flow path of an internal combustion engine and which is configured to convert hydrocarbons, by means of an oxygen-sensitive sensor that is installed downstream from the catalyst in the exhaust gas flow path and that exhibits a cross sensitivity to hydrocarbons. The method comprises: detecting a first signal of the downstream sensor in a first situation in which a first HC fraction is present in the exhaust gas upstream from the catalyst; detecting a second signal of the downstream sensor in a second situation in which a second HC fraction that is higher than the first HC fraction is present in the exhaust gas upstream from the catalyst; and determining the HC-conversion efficiency of the catalyst as a function of the first and second signals of the downstream sensor.

13 Claims, 9 Drawing Sheets

(51) Int. Cl.
*F01N 3/10* (2006.01)
*F01N 3/20* (2006.01)
*F01N 11/00* (2006.01)
*F01N 13/00* (2010.01)
*F01N 3/021* (2006.01)

(52) U.S. Cl.
CPC ..... *F01N2560/023* (2013.01); *F01N 2560/025* (2013.01); *F01N 2560/14* (2013.01); *Y02T 10/47* (2013.01)

(56) References Cited

FOREIGN PATENT DOCUMENTS

| | | |
|---|---|---|
| DE | 10 2008 041 385 A1 | 2/2010 |
| DE | 10 2012 201 504 A1 | 8/2012 |
| EP | 1 936 140 A1 | 6/2008 |
| JP | 2005-036812 A | 2/2005 |
| JP | 2010-053742 A | 3/2010 |

* cited by examiner

METHOD FOR DETERMINING HC-CONVERSION EFFICIENCY OF A CATALYST, A DIAGNOSTIC DEVICE CONFIGURED TO CARRY OUT THE METHOD AS WELL AS A MOTOR VEHICLE HAVING SUCH A CATALYST

CROSS-REFERENCE TO RELATED APPLICATIONS

This application is claiming priority from German Patent Application No. DE 10 2013 010 562.5, filed Jun. 25, 2013, which is hereby incorporated by reference in its entirety.

FIELD OF THE INVENTION

The invention relates to a method to determine the hydrocarbon-conversion efficiency of a catalyst that is situated in the exhaust gas flow path of an internal combustion engine and that is configured to convert hydrocarbons. The invention also relates to a diagnostic device configured to carry out the method as well as to a motor vehicle having such a catalyst.

BACKGROUND OF THE INVENTION

Exhaust gases from internal combustion engines contain hydrocarbons (HC) stemming from the incomplete combustion of the fuel in the engine. In order to bring about a post-engine conversion of such unburned hydrocarbons, Otto combustion methods as well as diesel combustion methods make use of exhaust gas catalysts that oxidize the hydrocarbons in the presence of oxygen in order to form carbon dioxide and water. Aside from oxidizing unburned hydrocarbons, such catalysts—which are also referred to as oxidation catalysts—also oxidize carbon monoxide to form carbon dioxide. If the catalyst is not only capable of performing oxidation but also of reducing nitrogen oxides present in the exhaust gas, one refers to them as three-way catalysts since they convert all of the exhaust gas components (HC, CO and $NO_x$) that fall under statutory limit values.

Since the HC-conversion efficiency of oxidation or three-way catalysts can deteriorate as they age, it is desirable to carry out a diagnosis of the catalyst in order to determine its HC-conversion efficiency. For this reason, various laws regulating the emission limit values for motor vehicles stipulate that catalysts must be monitored within the scope of on-board diagnostics (OBD). If the HC-conversion efficiency of an aged catalyst has deteriorated to such an extent that the vehicle exceeds certain emission limit values, the catalyst has to be recognized by the engine controls as being defective and this has to be indicated in a suitable manner.

For purposes of measuring the HC-conversion efficiency of a catalyst, it is a known procedure, for example, to evaluate the exothermic characteristics of the catalytic reaction of the HC conversion. For instance, late post-injection of fuel artificially increases the HC fraction in the exhaust gas from the internal combustion engine, and then the temperature of the catalyst is measured by means of a temperature sensor located downstream from the catalyst. In this context, owing to the exothermic characteristics of the HC combustion that takes place in the catalyst, a large temperature increase correlates with a high HC-conversion rate. Conversely, an aged oxidation catalyst can be recognized on the basis of a small temperature increase. In order to nevertheless achieve a significant temperature increase, a high HC fraction in the exhaust gas is necessary, that is to say, a large quantity of post-injected fuel. This, in turn, raises fuel consumption as well as the final emissions of hydrocarbons.

Another known method employs the oxygen storage capacity (OSC) of oxidation catalysts. Many oxidation catalysts, especially in the case of Otto engines, exhibit a high capacity for oxygen storage due to the use of suitable additives such as, for example, cerium oxide. A widespread diagnostic approach involves the measurement of the oxygen storage capacity of the catalyst by means of two lambda probes that measure the oxygen content of the exhaust gas before and after the catalyst. Here, the engine is at first run for a prolonged period of time at a rich air-fuel ratio, so that the exhaust gas has a low residual content of oxygen and a high HC fraction, as a result of which the catalyst is freed almost completely of oxygen. Subsequently, the engine is run at a lean ratio, so that its exhaust gas has a high residual content of oxygen and a low HC content at the engine outlet. The transition from rich to lean in an intact oxidation catalyst is measured by the downstream lambda probe with a pronounced time delay since the oxygen at first fills up the OSC of the catalyst and can only subsequently be measured at the catalyst outlet. As the catalyst ages over the course of time, the transition from rich to lean is measured sooner and sooner since the OSC is reduced due to ageing or due to a defect. Fundamentally, the diagnosis can also be carried out after an abrupt change from lean to rich. The drawback of this approach is that it is not the HC-conversion efficiency itself that is measured, but rather the oxygen storage capacity of the catalyst. In various operating states, however, these two variables only correlate to a certain extent. Moreover, the diagnosis of the oxygen storage capacity is greatly influenced by dynamic effects and consequently not very reliable during operation.

German patent application no. DE 10 2007 012 701 A1 discloses the technique of monitoring the function of an oxidation catalyst by means of a particle sensor installed downstream. A resistive particle sensor is employed which detects deposited particles by measuring the electric resistance between two interdigital electrodes. Such sensors have a cross sensitivity to unburned hydrocarbons since the latter are deposited on the electrodes and likewise cause an increase in the resistance. The method now calls for introducing systematically increased HC fractions into the exhaust gas upstream from the catalyst and for observing the response of the particle sensor downstream from the catalyst. An increasing sensor current will be measured if the catalyst is defective.

German patent application no. DE 10 2005 056 312 A1, in contrast, utilizes the HC cross sensitivity of a broadband lambda probe installed downstream from the oxidation catalyst in order to monitor it in terms of its HC-conversion efficiency. Owing to the HC cross sensitivity of the probe, the probe signal deviates from the true signal value that corresponds to the actual oxygen content. For this reason, it is proposed that a determination be made of the amount by which the measured probe signal of the broadband lambda probe deviates from the actual lambda value. In an intact oxidation catalyst, the deviation is close to zero, whereas the deviation is large if the catalyst is defective. The lambda actual value is either ascertained with a sensor that does not exhibit any HC cross sensitivity or else it is calculated on the basis of models.

German patent application no. DE 10 2008 041 385 A1 makes use of the HC cross sensitivity of a broadband lambda probe located downstream from the oxidation catalyst in order to recognize a defective catalyst. In this context, however, the HC cross sensitivity is used to detect a shift in the light-off temperature of the catalyst as it progressively ages. Here, the broadband lambda signal is detected downstream from the catalyst during the warm-up. Relatively high HC fractions are encountered downstream from the catalyst when it is still cold because its activity has not yet started. These high fractions account for a shift of the displayed signal value away from the true signal value that corresponds to the actual air-fuel ratio. As the catalyst heats up and the HC conversion starts, the HC fraction downstream from the catalyst decreases and thus so does the signal shift caused by the HC cross sensitivity. In the case of an intact catalyst, which has a comparable light-off temperature, the signal shift starts correspondingly sooner. A very aged catalyst, in contrast, can be recognized on the basis of the start of the signal shift that is late relative to the "true" signal value.

Before this backdrop, the present invention is based on the objective of putting forward a method to determine the HC-conversion efficiency of a catalyst, whereby this method generates relatively few process-related HC emissions, exhibits a high degree of reliability and independence from the operating point, and can be realized to the greatest extent possible without additional structural measures.

SUMMARY OF THE INVENTION

These objectives are achieved, at least partially, by a method, by a diagnostic device and by a motor vehicle having the features of the independent claims.

The method according to the invention determines the HC-conversion efficiency of a catalyst—which is situated in the exhaust gas flow path of an internal combustion engine and which is configured to convert hydrocarbons (HC)—by means of an oxygen-sensitive sensor that is installed downstream from the catalyst in the exhaust gas flow path and which exhibits an HC cross sensitivity. The method comprises the following steps:

the detection of a first signal of the downstream sensor in a first situation in which a first HC fraction is present in the exhaust gas upstream from the catalyst;

the detection of a second signal of the downstream sensor in a second situation in which a second HC fraction that is higher than the first HC fraction is present in the exhaust gas upstream from the catalyst; and the determination of the HC-conversion efficiency of the catalyst as a function of the first and second signals of the downstream sensor.

It goes without saying that it is inconsequential for the method in which sequence the first and second states are present, that is to say, the detection of the second signal in case of a high HC exposure in the catalyst can take place before or after the detection of the first sensor signal in the case of a low HC exposure.

The method according to the invention utilizes the HC cross sensitivity of an oxygen sensor in order to determine the HC-conversion efficiency. The cross sensitivity ensues from the fact that hydrocarbons oxidize in a cavity of the sensor while consuming oxygen on the surface of the sensor electrode (pump electrode), thereby reducing the oxygen partial pressure in the cavity of the sensor. As a result, the pump flow of the sensor at which a predetermined constant oxygen partial pressure is set in the cavity of the sensor changes in accordance with the quantity of oxygen that is consumed for the oxidation of the hydrocarbon according to the stoichiometry of the HC oxidation. Since hydrocarbons have a much higher molecular weight than oxygen, and thus diffuse into the cavity of the sensor at a relatively low diffusion rate, the sensitivity of the sensor to hydrocarbons is considerably less than to oxygen. The method according to the invention makes it possible to take advantage of this low sensitivity to hydrocarbons. Suitable sensors that display such an HC cross sensitivity and that can therefore be employed within the scope of the invention include broadband lambda sensors or else $NO_x$ sensors which normally also emit a broadband lambda signal.

Through the detection of the sensor signal in the first situation with a low HC exposure of the catalyst, preferably at an HC fraction close to zero, and the detection of the sensor signal in a situation with a comparatively high HC exposure of the catalyst as well as through the evaluation of both signals, the HC sensitivity of the sensor is enhanced in terms of its oxygen sensitivity and systematically utilized to determine the HC-conversion efficiency of the catalyst. If the HC-conversion efficiency is high, the downstream sensor detects very little oxygen. If, in contrast, the HC-conversion efficiency is very low, a comparatively large quantity of oxygen is detected downstream from the catalyst.

In a preferred embodiment of the method, the HC-conversion efficiency of the catalyst is determined as a function of the difference between the first signal and the second signal of the downstream sensor. This further diminishes the influence of the oxygen partial pressure in the exhaust gas as compared to the cross influence of the hydrocarbons.

Especially preferably, the oxygen content in the exhaust gas upstream from the catalyst in the first situation essentially corresponds to the oxygen content in the exhaust gas in the second situation. In this manner, it is achieved that the difference of the signal value of the downstream sensor is brought about exclusively by the catalytic activity of the catalyst and not by the differences in the lambda value of the internal combustion engine.

According to an advantageous refinement of the method, another oxygen-sensitive sensor is installed upstream from the catalyst, said sensor likewise being a broadband lambda probe or (less preferred in this case) an $NO_x$ sensor. In this context, a first signal of the upstream sensor is detected in the first situation (low HC fraction upstream from the catalyst), and a second signal of the upstream sensor is detected in the second situation (high HC fraction). Moreover, a first differential signal between the first signal of the downstream sensor and the first signal of the upstream sensor is formed, and a second differential signal between the second signal of the downstream sensor and the second signal of the upstream sensor is formed. The HC-conversion efficiency of the catalyst is determined as a function of the first and second differential signals. In other words, according to this embodiment of the method, at the two points in time when the signal of the downstream sensor is detected, a signal of the upstream sensor is likewise detected and the two sensor signals are subtracted from each other. This further diminishes the dependence of the determination on fluctuations of the oxygen partial pressure since the fractions of the sensor signal caused by the oxygen content in the exhaust gas are subtracted from each other. In the state with the low HC exposure of the catalyst, a difference between the signals upstream and downstream from the catalyst is obtained that corresponds to an oxygen partial pressure differential that is close to 0 hPa, irrespective of the HC-conversion efficiency of the catalyst. In the state with the high HC exposure of the catalyst, in contrast, the difference depends on the HC-conversion rate. At a very low HC-conversion rate, the difference of the sensor signals upstream and downstream from the catalyst is close to 0 hPa, and at a high HC-conversion rate, there is a negative difference between the sensor signals.

In an especially preferred embodiment, the HC-conversion efficiency of the catalyst is determined as a function of the difference between the first differential signal and the second differential signal, that is to say, the difference between the differential signal detected at a point in time of low HC exposure of the catalyst and the differential signal detected at a point in time of high HC exposure of the catalyst. The result of this determination minimizes the influences of oxygen fluctuations on the calculation result and it forms a characteristic value that correlates directly with the HC-conversion rate.

The HC fraction of the exhaust gas that occurs in the second state of the catalyst can be increased passively or actively. With the passive approach, according to a first embodiment of the method, the elevated HC fraction in the exhaust gas of the second situation is present because of a corresponding operating point of the internal combustion engine, especially because of an elevated engine load, for example, in case of a full load of the vehicle. The passive approach does not require any additional artificial actuating interventions into the engine operation by the engine controls. The passive approach has the advantage that it does not generate any additional HC emissions.

The active approach according to a second embodiment of the method provides that the elevated HC fraction in the exhaust gas is created by at least one active measure that leads to a deterioration of the engine efficiency and thus to increased HC raw emissions or directly to an additional HC exposure. In particular, such a measure involves trimming of the points in time of the injection of fuel into a combustion chamber of the internal combustion engine, whereby preferably a late post-injection of fuel takes place at a point in time when this post-injected fuel is not involved in the combustion process at all or else only to a limited extent, that is to say, it takes place at an essentially neutral moment. In the case of an Otto combustion engine, the active measure can also entail trimming of the ignition point in time, especially a late ignition that is delayed (with respect to an ignition point in time that is optimized in terms of efficiency). Fundamentally speaking, any actuating intervention by the engine that leads to an additional HC exposure of the catalyst can be employed, whereby the actuating interventions that are used are preferably those that do not give rise to any significant change in the residual oxygen content present in the exhaust gas.

According to another embodiment, the active measure for raising the HC raw emissions of the internal combustion engine preferably only takes place when it can be expected that the catalyst is essentially intact, in other words, there is no need to anticipate an insufficient HC-conversion efficiency on the part of the catalyst. When, over the course of time, the catalyst approaches a critical threshold value in terms of its HC-conversion efficiency, then, starting at a certain value, only the passive approach can be taken in order to generate the elevated HC fraction in the exhaust gas upstream from the catalyst. This makes it possible to prevent an unnecessary rise in the HC end emissions due to the method.

On the one hand, the catalyst can be an oxidation catalyst that essentially catalyzes exclusively the oxidation of hydrocarbon and carbon monoxide in the presence of oxygen. As an alternative, the catalyst can be a three-way catalyst, especially in the case of an Otto engine that supports not only the oxidation of hydrocarbons and carbon monoxide but also the reduction of nitrogen oxides.

In a preferred embodiment, the execution of the method presupposes the presence of specified boundary conditions. Preferably, the method is carried out when the catalyst temperature lies within a given temperature range, especially within a temperature range of 170° C. to 350° C. [338° F. to 662° F.], preferably within a temperature range of 200° C. to 300° C. [392° F. to 572° F.]. It has been found that the differences between an aged catalyst and a new catalyst regarding the HC-conversion efficiency are at their most pronounced level within these temperature ranges. Consequently, the method can be carried out particularly reliably within this temperature range. The temperature data can be obtained in various ways. This includes ascertaining the catalyst temperature or the catalyst distribution by means of a calculation model. As an alternative, the catalyst temperature can be measured using a temperature sensor in the catalyst. According to another alternative, the exhaust gas temperature can be measured by an upstream temperature sensor and/or by a downstream temperature sensor, and the catalyst temperature can be inferred on this basis.

Preferably, the method is also carried out only if specific, relatively constant boundary conditions are present that relate, for instance, to the engine speed, to the fresh air mass and/or to the exhaust gas recirculation rate and the like. The execution of the method under relatively stationary boundary conditions further increases the reliability. Moreover, certain absolute ranges that have to be complied with can be stipulated for the above-mentioned parameters or for other parameters. For example, it has proven to be advantageous to carry out the method with simultaneous exhaust gas recirculation since this reduces the residual oxygen content in the exhaust gas and therefore the amount of fuel necessary for generating the HC pulse can be reduced.

The invention also relates to a diagnostic device that is configured, especially programmed, to carry out the method according to the invention in order to determine the HC-conversion efficiency of a catalyst. In particular, the diagnostic device contains an appropriate computer-readable program algorithm for carrying out the method, and it optionally has the requisite family of characteristics.

The invention also relates to a motor vehicle that has such a diagnostic device.

Additional preferred embodiments of the invention can be gleaned from the other features cited in the subordinate claims.

BRIEF DESCRIPTION OF THE DRAWINGS

The invention will be explained below on the basis of embodiments with the accompanying drawings. The following is shown.

DETAILED DESCRIPTION OF THE INVENTION

The invention will be explained below on the basis of the example of the determination of the HC-conversion efficiency of an oxidation catalyst in an exhaust gas system of a diesel-powered internal combustion engine.

Figure 1:
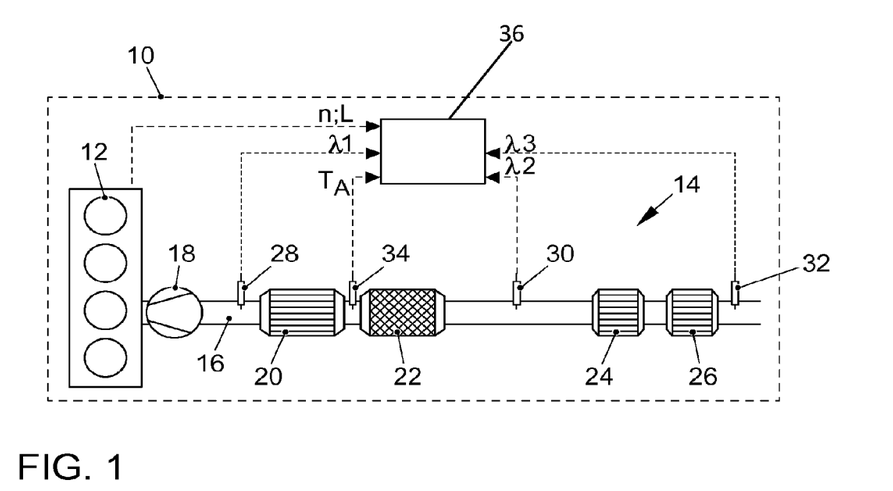
FIG. 1 an example of an exhaust gas system with an oxidation catalyst and a diagnostic device according to the present invention.

FIG. 1 shows a sketched motor vehicle which is designated in its entirety by the reference numeral 10 and whose traction source is a diesel engine 12 (either on its own or in combination with an electric motor). Exhaust gas from the internal combustion engine 12 undergoes after-treatment in an exhaust gas system, which is designated in its entirety by the reference numeral 14.

The exhaust gas system 14 comprises an exhaust gas channel 16 that is flow-connected to the cylinders of the internal combustion engine 12 via their outlet channels and that therefore receives the exhaust gas from the engine 12. In the exhaust gas channel 16, there is first an exhaust gas turbine 18 of a turbocharger (not shown here) that serves to charge the engine 12. Along the further course of the flow path of the exhaust gas, there is then an oxidation catalyst 20 as a first exhaust-gas cleaning component. The catalyst 20 has a through-flow substrate comprising a plurality of axial flow channels arranged in parallel. In a generally known manner, the substrate can be present as a metal substrate or as a ceramic substrate. The through-flow substrate of the catalyst 20 has a so-called washcoat layer consisting of a ceramic material having a large specific surface, for instance, aluminum oxide ($Al_2O_3$), zirconium oxide ($Zr_2O_3$), titanium oxide ($TiO_2$) or others. The washcoat layer is loaded with a catalytic material which, in the presence of oxygen, catalyzes the oxidation of hydrocarbons HC and carbon monoxide CO to form $CO_2$ and $H_2O$. For this purpose, it contains suitable noble metals such as platinum and/or palladium.

A diesel particulate filter (DPF) 22 that serves to remove particulate exhaust-gas components is installed downstream from the oxidation catalyst 20 in the exhaust gas flow path. The PDF 22 comprises a porous, normally ceramic substrate that has a plurality of parallel flow channels. In this context, some of the flow channels are closed on the inlet side while the other ones are closed on the outlet side. The flow channels that are closed on the inlet and outlet sides are arranged alternatingly. Thus, the exhaust gas coming from the internal combustion engine 12 enters the flow channels of the particulate filter 22, which are closed on the outlet side and open on the inlet side. In this manner, the exhaust gas is forced to flow through the porous wall structures of the channels, whereby particulate components of the exhaust gas are held back on and in the porous wall structures. From there, the exhaust gas enters the flow channels that are open on the outlet side and closed on the inlet side in order to subsequently leave the particulate filter 18. The configuration of the particulate filter 22 described above is also referred to as a wall-flow filter. Therefore, the arrangement of the DPF 22 just behind the oxidation catalyst 20 is advantageous since the exothermic characteristics of the catalyst 20 are utilized to heat up the DPF for purposes of its periodic regeneration.

In the example shown, the exhaust gas system 14 also has a first SCR catalyst 24 that works according to the principle of selective catalytic reduction (SCR). As the name says, this catalyst selectively reduces nitrogen oxides $NO_x$ to form nitrogen in the presence of a given reducing agent. The reducing agent, which is normally ammonia, is metered into the exhaust gas upstream from the SCR catalyst 24, for instance, in the form of a chemical precursor compound such as urea (metering device not shown here). As a slip catalyst, there is a second SCR catalyst 26 located downstream from the first SCR catalyst 24. The former serves to prevent reducing agent transitions. Alternatively, instead of the second SCR catalyst 26, there can also be a second oxidation catalyst as the slip catalyst.

Moreover, the exhaust gas system 14 has a suitable sensor system with which various parameters of the exhaust gas can be detected, for instance, the concentrations of certain exhaust gas components, the temperature of the exhaust gas and/or various components of the system or the exhaust gas mass flow or exhaust gas volume flow or the like. In particular, the sensor system shown in this example has a first broadband lambda probe 28 that is arranged upstream from the oxidation catalyst 20. Moreover, a second broadband lambda probe 30 is installed downstream from the oxidation catalyst 20, here downstream from the DPF 22. The broadband lambda probes 28 and 30 measure the oxygen content in the exhaust gas and serve for purposes of monitoring and for on-board diagnostics of the catalyst 20. The broadband lambda probe 30 can also be installed between the oxidation catalyst 20 and the DPF 22. This arrangement entails the advantage of a faster response time. However, the thorough blending of the exhaust gas in this position is somewhat worse than downstream from the DPF 22, so that the measurement is slightly less precise. An $NO_x$ sensor 32 is installed downstream from the second SCR catalyst and it serves primarily to monitor and control the SCR system. Moreover, downstream from the oxidation catalyst 20 and upstream from the particulate filter 22, there is a temperature sensor 34 for measuring the exhaust gas temperature $T_A$, which provides information about the temperature of the oxidation catalyst 20 and as well as of the particulate filter 22. As an alternative, the temperature sensor 34 can be located in another suitable position or else it can be replaced by a model value.

The signals of all of the sensors are fed into a diagnostic device 36 which is configured to determine the HC-conversion efficiency of the oxidation catalyst 20 on the basis of the method according to the invention. Moreover, the diagnostic device 36 receives signals that characterize the operating point and operating parameters of the engine 12. These are, for example, the engine speed n and the engine load L.

Figure 2:
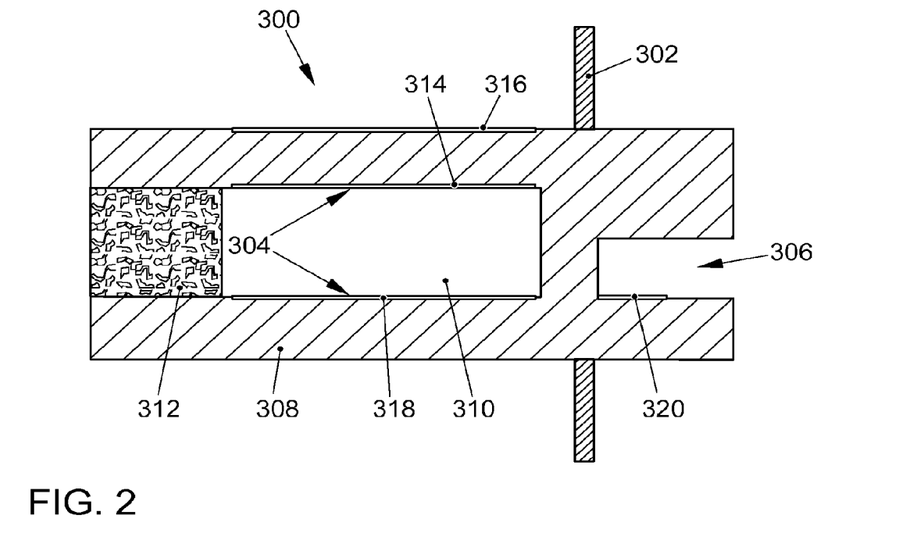
FIG. 2 the fundamental structure of a broadband lambda probe.

FIG. 2 shows a fundamental structure of a broadband lambda probe 300 that is arranged in an opening of a wall 302, for instance, the wall of an exhaust gas channel, and that is thus surrounded by an exhaust gas flow 304 on the one hand and by ambient air 306 on the other hand.

The broadband lambda probe 300 has a base structure 308 made of a material that constitutes a dielectric material for oxygen anions $O^{2-}$ and that is normally yttrium-doped zirconium dioxide. The probe 300 has a cavity 310 that is separated by a diffusion barrier 312 from the exhaust gas 304 that circulates there. An internal pump electrode 314 and an external pump electrode 316, together with the $O^{2-}$ dielectric material situated between them, form a pump cell. On the other side, a Nernst electrode 318 that is likewise located inside the cavity 310 as well as a reference electrode 320 that is in contact with fresh air 306, form the Nernst cell.

The broadband lambda probe 300 functions according to the so-called limiting current principle. The oxygen partial pressure in the cavity 310 is set or regulated to a constant value that is low relative to the ambient air 306, for instance, to a value corresponding to $\lambda=1$. This is done in that a pump voltage is applied to the pump electrodes 314, 316. The oxygen $O_2$ contained in the measuring gas of the cavity 310 is ionized on the pump electrodes to form $O^{2-}$ ions and then diffuses via the dielectric material 308 either out of the exhaust gas side into the cavity 310 or else out of the cavity 310 to the exhaust gas side, depending on the polarity. In this context, the pump flow through a regulator is regulated in such a manner that the oxygen flow in the cavity 310 precisely compensates for the diffusion flow and keeps the measuring gas in the cavity constant at the desired value. The exhaust gas 304 diffuses through the diffusion barrier 312 into the cavity 310. In the case of a rich air-fuel mixture ($\lambda<1$), the pump flow pumps oxygen ions into the measuring gas in the cavity 310, whereas in the case of a lean mixture ($\lambda>1$), oxygen is pumped from the inside towards the outside. Therefore, the sign and the magnitude of the pump flow allow a determination to be made about the oxygen partial pressure in the exhaust gas 304.

It is not only the oxygen contained in the exhaust gas 304 that reaches the cavity 310 via the diffusion barrier 312, but also other components of the exhaust gas such as, for instance, unburned hydrocarbons HC stemming from an incomplete combustion in the Otto or diesel engine. Hydrocarbons oxidize on the inner pump electrode 314 and thus reduce the oxygen partial pressure in the cavity 310. Consequently, in the stationary state, a pump flow through the pump cell is established that is reduced by the fraction of oxygen that is consumed during the oxidation of the hydrocarbons present in the cavity 310. Owing to its considerably higher molecular weight, hydrocarbons have a considerably lower diffusion rate through the diffusion medium 312 than oxygen does. For this reason, the broadband lambda probe 300 is much less sensitive to unburned hydrocarbons in the exhaust gas 304 than corresponds to the stoichiometric factor of the hydrocarbons contained in the exhaust gas 304. This physical effect is utilized within the scope of the present invention in order to determine the HC-conversion rate of a catalyst.

Towards this goal, the sensor signal $\lambda 2$ or $\lambda 3$ is detected, for example, in an exhaust gas system like the one shown in FIG. 1 and having a probe which is located downstream from the oxidation catalyst 20 and which has the HC cross sensitivity described above, especially the broadband lambda probe 30 or the $NO_x$ sensor 32 at various points in time when the oxidation catalyst 20 is exposed to different HC concentrations. This is especially done in a first situation in which the exhaust gas has a very low HC fraction, especially an HC fraction close to zero, as well as at a point in time when there is a comparatively much higher HC fraction present in the exhaust gas. The HC-conversion efficiency of the oxidation catalyst 20 is then determined by evaluating these signals from the sensor 30 or 32. To the greatest extent possible, the oxygen content in both measuring states should be the same. This can be realized, for example, in that an artificial actuating intervention into the combustion process of the internal combustion engine 12 creates a defined HC emission from the engine 12. For instance, this can be achieved by a systematic post-injection of fuel at a point in time when the combustion is virtually completed and thus the post-injected fuel is hardly involved in the combustion or not at all. As an alternative, as already explained above, it is also possible to utilize the presence of an elevated HC emission (passive approach), which is a function of the operating point.

In a preferred embodiment, the method comprises the following steps:

In a first situation (point in time t1) with a low HC fraction in the exhaust gas: detection of a first signal $\lambda 2(t1)$ or $\lambda 3(t1)$ of the downstream sensor 30 or 32 and detection of a first signal $\lambda 1(t1)$ of the upstream sensor 28.

Formation of a first differential signal $\Delta\lambda(t1)$ between the first signal $\lambda 2(t1)$ or $\lambda 3(t1)$ of the downstream sensor 30 or 32 and the first signal $\lambda 1(t1)$ of the upstream sensor 28 according to the following equation:

$$\Delta\lambda(t1)=\lambda 2(t1)-\lambda 1(t1) \text{ or}$$

$$\Delta\lambda(t1)=\lambda 3(t1)-\lambda 1(t1).$$

Passive or active generation of an elevated HC concentration in the exhaust gas, for example, by means of late post-injection.

In a second situation (point in time t2) with a high HC fraction in the exhaust gas, for example, after the late post-injection: detection of a second signal $\lambda 2(t2)$ or $\lambda 3(t2)$ of the downstream sensor 30 or 32 and detection of a second signal $\lambda 1(t2)$ of the upstream sensor 28.

Formation of a second differential signal $\Delta\lambda(t2)$ between the second signal $\lambda 2(t2)$ or $\lambda 3(t2)$ of the sensor 30 or 32 and the second signal $\lambda 1(t1)$ of the sensor 28 according to the following equation:

$$\Delta\lambda(t2)=\lambda 2(t2)-\lambda 1(t2) \text{ or}$$

$$\Delta\lambda(t2)=\lambda 3(t2)-\lambda 1(t2).$$

Determination of the HC-conversion efficiency of the catalyst 20 as a function of a differential $\Delta$ between the first differential signal $\Delta\lambda(t1)$ and the second differential signal $\Delta\lambda(t2)$ according to the equation:

$$\Delta=\Delta\lambda(t2)-\Delta\lambda(t1).$$

The differential $\Delta$ thus determined can be employed as the characteristic value $K\eta HC$ of the HC-conversion rate of the catalyst 20. The unit for the differential $\Delta$ or the characteristic value $K\eta HC$ is determined in accordance with the unit that is used for the first and second sensor signals $\lambda 1$, $\lambda 2$ or $\lambda 3$. For instance, the sensor signals can be employed in the form of a sensor voltage or a sensor current or, preferably, in the form of the oxygen partial pressure that correlates thereto (the unit being, for example, hPa) or the oxygen content (in %).

Figure 3A:
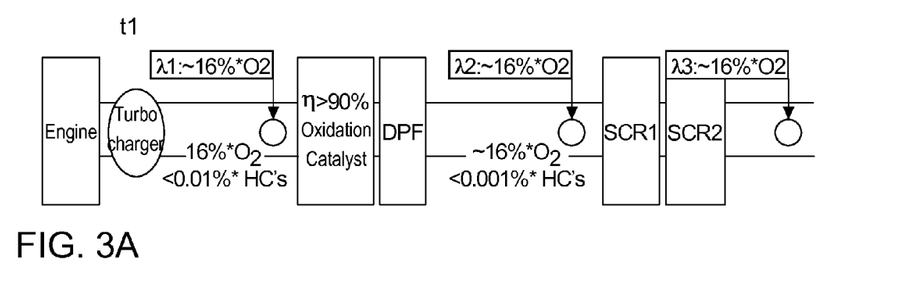
FIGS. 3A and B: $O_2$ and HC fractions in the exhaust gas upstream and downstream from the oxidation catalyst of the exhaust gas system according to FIG. 1 as well as the appropriate sensor signals for an oxidation catalyst with a high HC-conversion efficiency in (A) a situation with a low HC fraction, and (B) a situation with a high HC fraction in the exhaust gas of the engine.
Figure 3B:
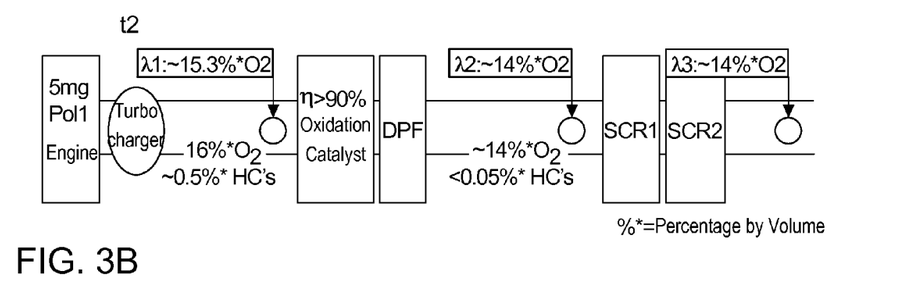
Figure 4A:
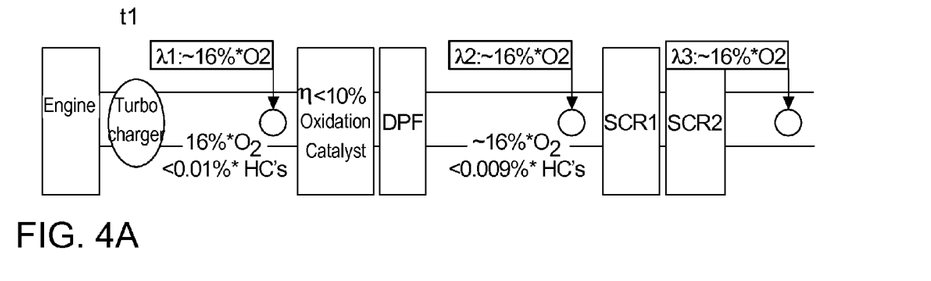
FIGS. 4A and B: $O_2$ and HC fractions in the exhaust gas upstream and downstream from the oxidation catalyst of the exhaust gas system according to FIG. 1 as well as the appropriate sensor signals for an oxidation catalyst with a low HC-conversion efficiency in (A) a situation with a low HC fraction, and (B) a situation with a high HC fraction in the exhaust gas of the engine.

FIGS. 3A and B and FIGS. 4A and B show by way of an example the contents of oxygen $O_2$ and hydrocarbons HC in the exhaust gas upstream and downstream from the oxidation catalyst 20 as well as the correlating sensor signals of the sensors 28, 30 and 32 in accordance with FIG. 1. All of the percentage values refer to volume percentages. FIGS. 3A and B shows the corresponding information for an intact oxidation catalyst 20 that exhibits an HC-conversion rate $\eta>90\%$. In contrast, FIGS. 4A and B show the situation for an aged oxidation catalyst with an HC-conversion rate η<10%. FIGS. 3A and 4A each show the exhaust gas conditions at the point in time t1 immediately before a late post-injection of fuel, in other words, at a point in time when there are very low HC fractions in the exhaust gas upstream from the oxidation catalyst. In contrast, FIGS. 3B and 4B each show the situation at the point in time t2, at the end of the late post-injection of fuel. The amount of fuel injected was 5 mg.

According to FIG. 3A, the HC fraction in the raw exhaust gas of the engine 12 upstream from the oxidation catalyst 20 at the point in time t1 before the post-injection of fuel is less than 0.01% at an oxygen concentration of 16%. The low HC fraction in the exhaust gas causes practically no cross influence of the sensor signal $\lambda 1$ of the upstream broadband lambda probe 28, so that the latter displays a value of about 16% $O_2$. The intact oxidation catalyst 20 reduces the HC fraction to a value of about less than 0.001%. The small amount of absolutely reacted HC here practically does not cause any measurable deviation of the oxygen content, so that the downstream broadband lambda probe 30 likewise displays a value of about 16% $O_2$. Since this value is not influenced by the SCR catalysts either, the downstream $NO_x$ sensor 32 likewise displays a broadband lambda signal $\lambda 3$ of about 16%.

At the end of the late post-injection at the point in time t2, according to FIG. 3B, the raw exhaust gas of the engine exhibits a high HC fraction of about 0.5% with an unchanged oxygen content of 16%. This comparatively high HC fraction in the exhaust gas has a perceptible influence on the sensor signal of the broadband lambda probe 28 of, for instance, $\lambda 1$=15.3% $O_2$. The intact oxidation catalyst results in a pronounced reduction in the HC concentration in the exhaust gas, which amounts to less than 0.05% downstream from the catalyst. At the same time, the catalytic post-combustion of the hydrocarbons consumes oxygen, so that the oxygen content downstream from the catalyst is only about 14%. Owing to the low HC fraction downstream from the catalyst, the value displayed by the downstream lambda probe 30 essentially corresponds to the "true" value of about 14%. This also applies to the broadband lambda signal $\lambda 3$ of the $NO_x$ sensor 32.

Figure 4B:
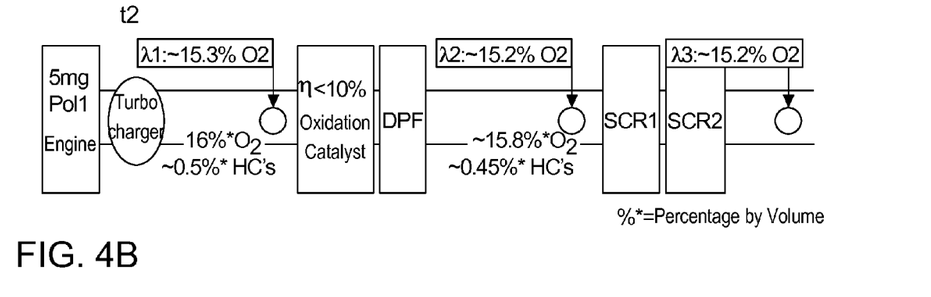

In the case of an aged catalyst with an efficiency η<10%, the rise in the HC raw emissions caused by the post-injection leads to a comparatively small drop in the HC fractions to about 0.45% downstream from the oxidation catalyst (FIG. 4B). The low conversion efficiency goes hand in hand with a corresponding small drop in the oxygen content from 16% to about 15.8%. Accordingly, the cross influence by the hydrocarbons on the downstream lambda signals $\lambda 2$ and $\lambda 3$ decreases only slightly from 15.3% upstream from the oxidation catalyst to 15.2% downstream from the oxidation catalyst.

Through the evaluation according to the invention of the sensor signals upstream and downstream from the oxidation catalyst at points in time of low and high HC fractions in the raw exhaust gas, it is possible to visibly demonstrate the influence of the HC cross sensitivity on the sensor signal as well as the HC-conversion efficiency of the catalyst.

Figure 5:
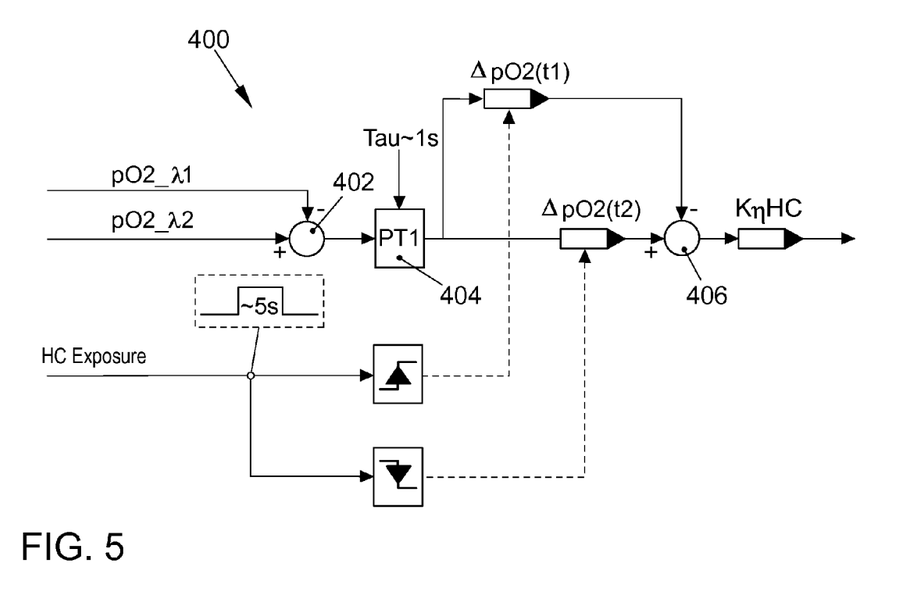
FIG. 5 a logical operating diagram for ascertaining a characteristic value for the HC-conversion efficiency of a catalyst.

The determination according to the invention of a characteristic value for the HC-conversion efficiency of a catalyst is depicted in FIG. 5 in the form of a logical operating diagram.

The input values of a subtractor 402 are, on the one hand, the specific lambda signals of the probes 30, 32 located downstream from the catalyst, here in the form of the oxygen partial pressure $pO_2$ ($pO_2$ $\lambda 2$), as well as the signal measured with the upstream lambda probe 28, $pO_2$ $\lambda 1$. The formation of the differential is performed, on the one hand, shortly before the catalyst 20 is exposed to hydrocarbons, thus yielding the first differential value $\Delta pO_2(t1)$ for the state of low HC exposure. At the end of the HC pulse, which here lasts, for instance, for 5 seconds, there is a renewed differential formation in the subtractor 402, yielding the second differential value $\Delta pO_2(t2)$ for the state of high HC fractions in the exhaust gas. In a second subtractor 406, the formation of the differential takes place between the two output values of the first subtractor 402. The output value of the second subtractor 406 is the characteristic value KηHC for the HC-conversion efficiency of the catalyst.

Figure 6A:
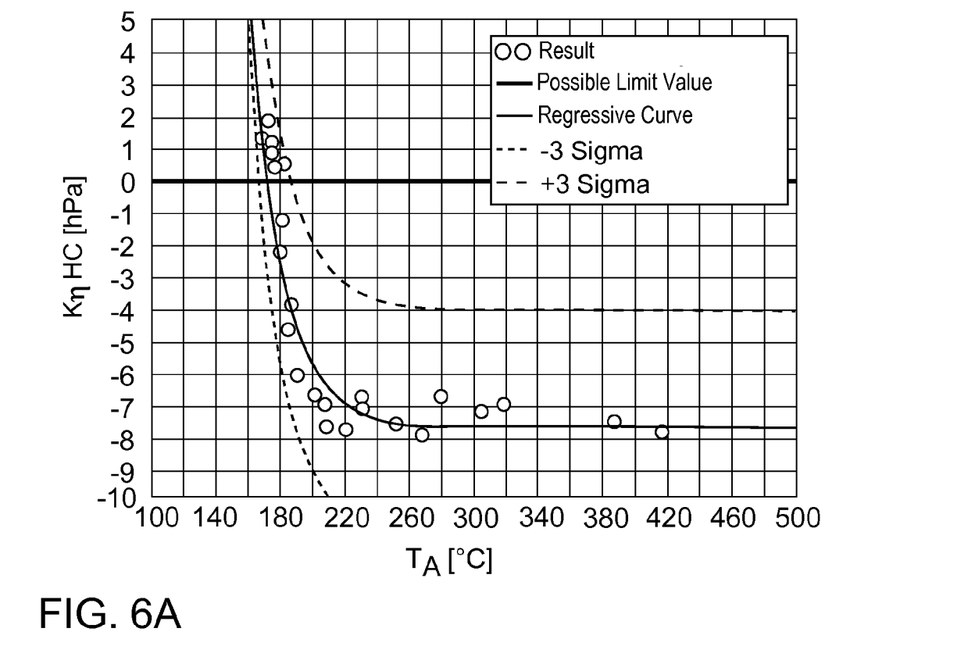
FIGS. 6A and B: the curve of the characteristic value ascertained according to the invention for the HC-conversion efficiency of an oxidation catalyst as well as the theoretically expected curve as a function of the exhaust gas temperature downstream from the catalyst (A) in hPa, and (B) in %.
Figure 6B:
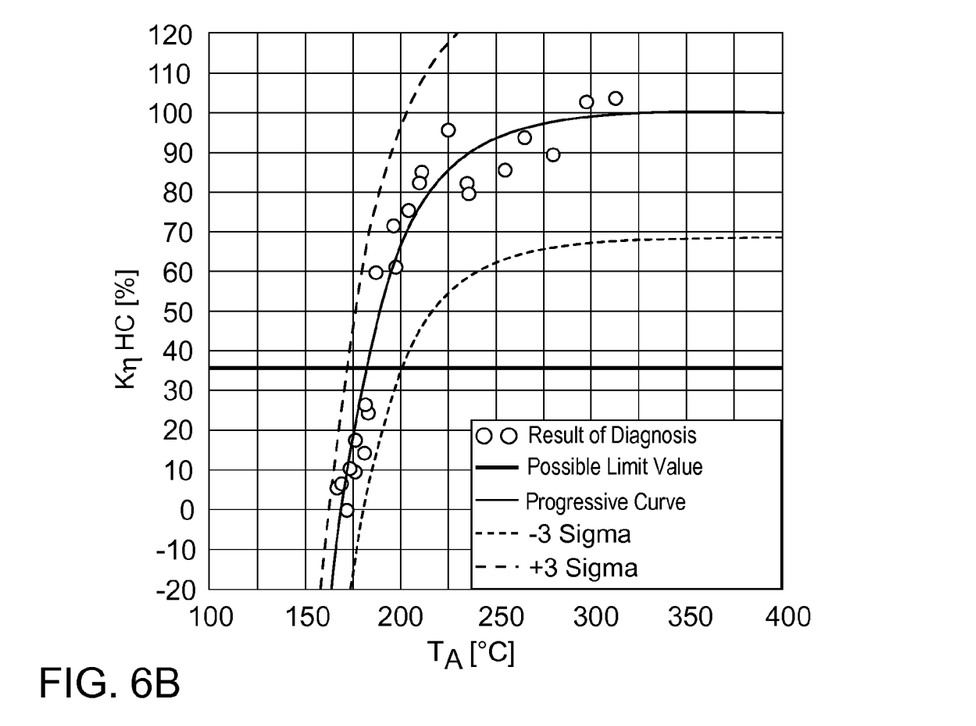

In order to validate the method according to the invention, the inventive determination of the conversion efficiency was performed by means of the method sequence shown in FIG. 5 in an exhaust gas system according to FIG. 1. In this context, the method was executed during the warm-up of the oxidation catalyst 20, whereby there was a late post-injection of 5 mg of fuel (pol 1) every 60 seconds. The engine 12 was run under constant operating conditions (engine speed n=1400 rpm, fresh air mass~90 kg/h and exhaust gas recirculation [EGR] rate=0%). At the same time, the exhaust gas temperature was measured by means of the temperature sensor 34. FIG. 6A shows the thus-ascertained characteristic value KηHC as a function of the exhaust gas temperature $T_A$. The solid line shows the expected regressive curve of the catalytic activity. It can be seen that the characteristic numbers ascertained with the method according to the invention (shown with dots) correlate very well with the expected behavior. Accordingly, the so-called light-off temperature of a new oxidation catalyst takes place within a temperature range of 200° C. to 250° C. [392° F. to 482° F.]. Here, the HC-conversion rate below a temperature of 200° C. [392° F.] is small, whereas the maximum HC-conversion rate is reached at a temperature above 250° C. [482° F.]. The very good correlation between the characteristic number ascertained with the method according to the invention for the HC-conversion efficiency of the catalyst and the expected curve shows the reliability of this approach. FIG. 6B shows the same results as in FIG. 6A, except that the values were expressed in terms of a percentage conversion rate.

Figure 7A:
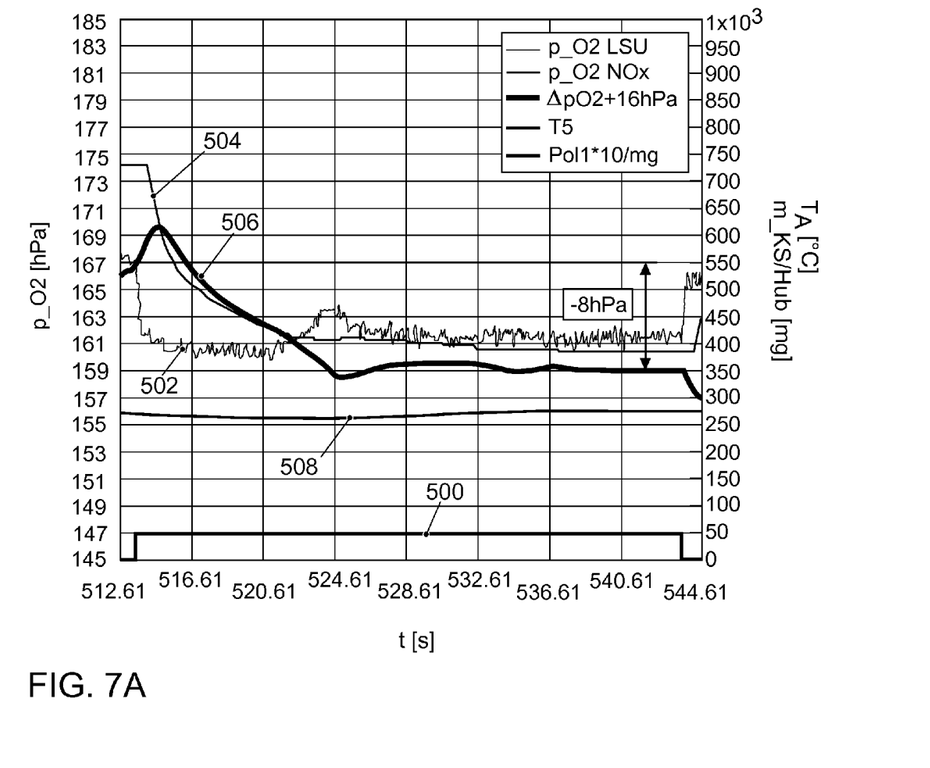
FIGS. 7A and B: curves showing the course-over-time of the oxygen partial pressure upstream and downstream from the oxidation catalyst during a late post-injection of fuel with (A) a catalyst that has been warmed up during operation, and (B) a cold catalyst.
Figure 7B:
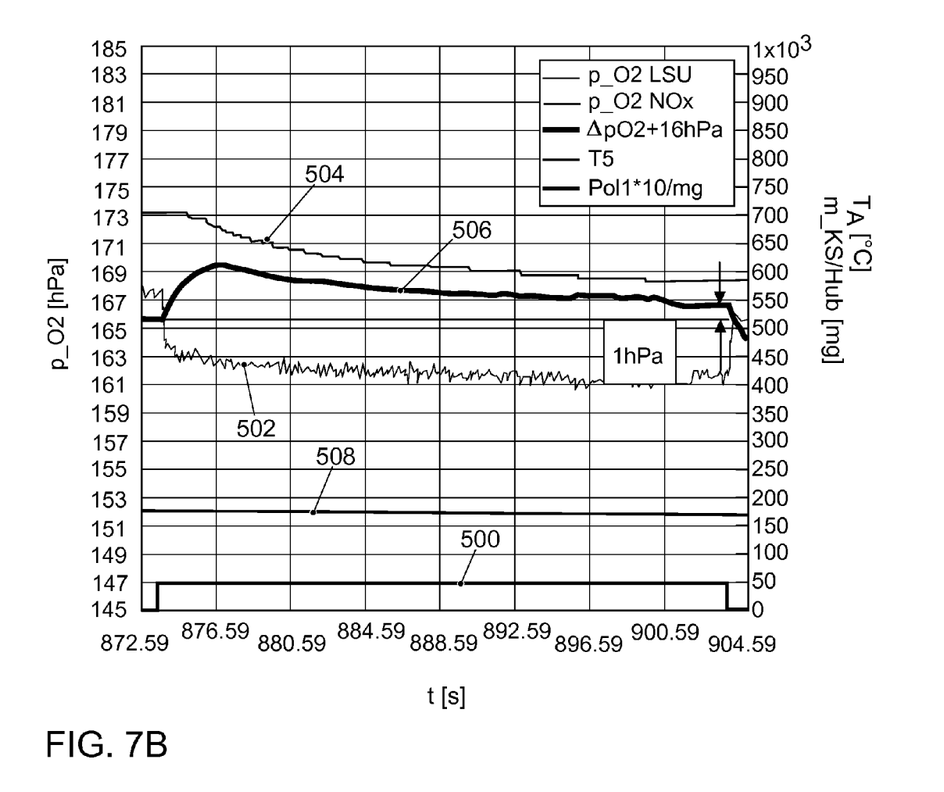
Figure 8A:
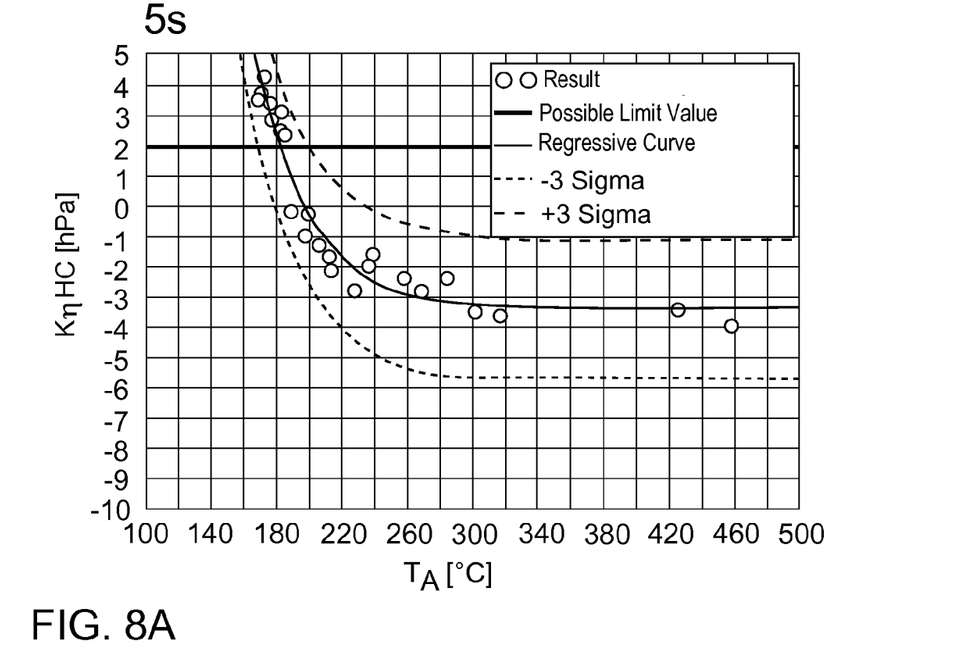
FIGS. 8A-D the curve of the characteristic value ascertained according to the invention for the HC-conversion efficiency as well as the theoretically expected curve as a function of the exhaust gas temperature downstream from the oxidation catalyst for different durations with active late post-injection of fuel: (A) 5 seconds, (B) 6 seconds, (C) 8 seconds and (D) 30 seconds.
Figure 8B:
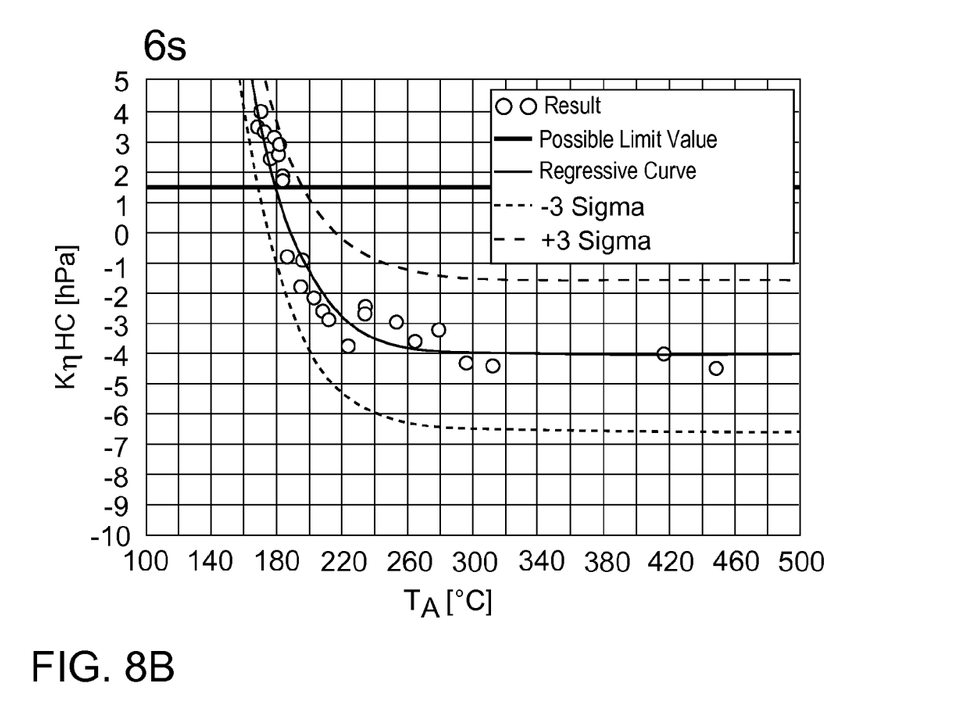
Figure 8C:
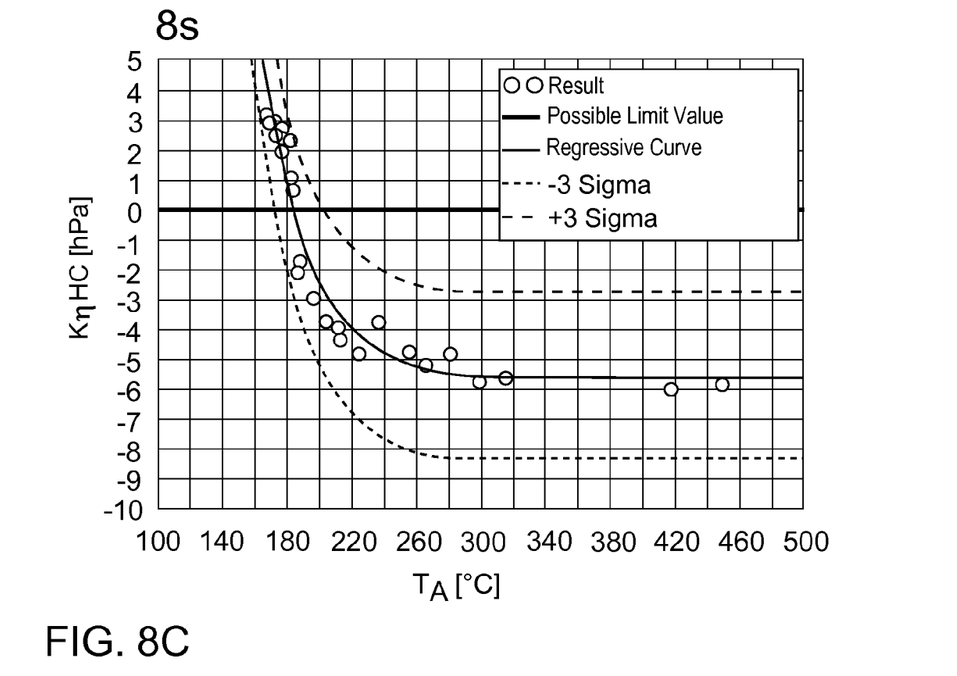
Figure 8D:
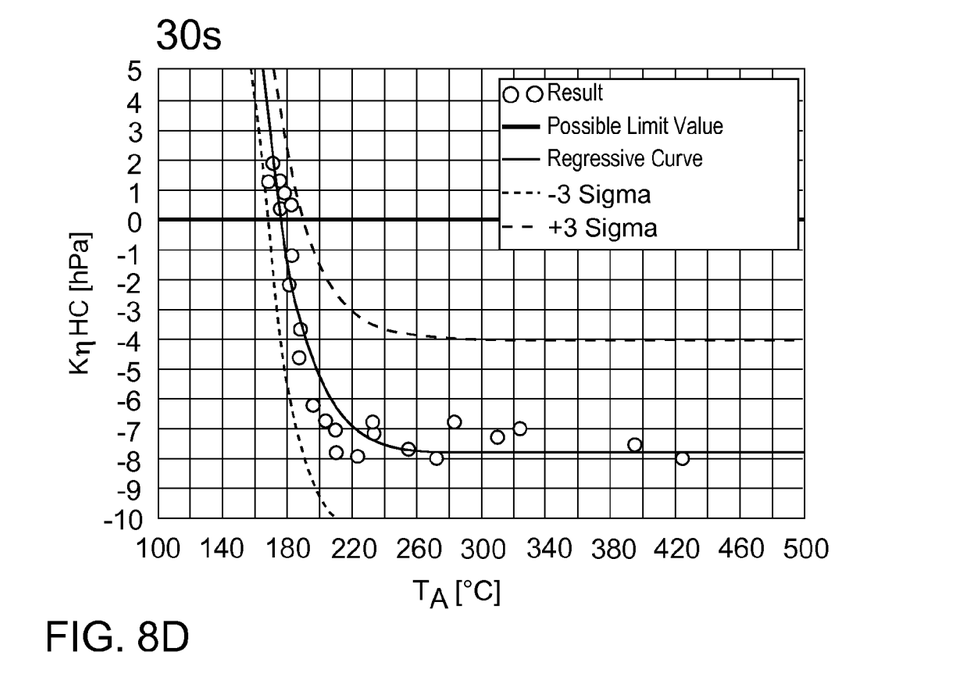

FIG. 7 depicts the curves of the oxygen partial pressure during the active late post-injection of fuel, measured with the broadband lambda probe 28 located upstream from the oxidation catalyst 20 as well as with the $NO_x$ sensor 32 located downstream from the SCR catalyst. In this context, FIG. 7A shows the curves for a catalyst that has been warmed up during operation ($T_A$=275° C. [527° F.]) and FIG. 7B for a cold catalyst ($T_A$=175° C. [347° F.]). The post-injection was carried out over a duration of 30 seconds with an amount of 5 mg of fuel per stroke. Post-injection with a warm catalyst led to a relatively pronounced displacement of the oxygen partial pressure measured downstream from the oxidation catalyst (graph 504) and led to a $\Delta p=2$ of −8 hPa (graph 506). With a cold catalyst, the response of the partial pressure downstream from the oxidation catalyst is naturally small (see FIG. 7B). It can also be seen in FIG. 7A that the maximum shift of the oxygen partial pressure downstream from the catalyst already starts at an early point in time after the beginning of the late post-injection.

Therefore, in order to minimize the fuel consumption brought about by the diagnostic method, experiments were carried out with different durations of the post-injection. The outcome is shown in FIGS. 8A-D, whereby the duration of the post-injection was 5 seconds in A, 6 seconds in B, 8 seconds in C and 30 seconds in D. These results show that a duration of the late post-injection within the range from 6 to 8 seconds appears to be advantageous. Further fuel savings might also be possible by optimizing the pulse shape of the amount of late post-injected fuel. In this context, it can be advantageous to initially employ a greater quantity of fuel per stroke, followed by a smaller quantity of injected fuel per stroke. For example, the late post-injection of 8 mg of fuel can take place over the course of 1 second and subsequently, a reduced amount of 5 mg per stroke over 4 seconds.

The amount of fuel to be used for the method as well as the HC emissions that are additionally caused because of it were estimated. According to this estimation, in the case of a post-injected fuel amount of 5 mg per stroke over 5 seconds in the testing cycle involving a driving distance of 20 miles at 1500 rpm with an efficiency of 90% on the part of the oxidation catalyst, the additional HC emissions amount to 5 mg per mile at a limit value of 55 mg per mile. In the case of a threshold of the permissible HC efficiency of the catalyst amounting to 50% by way of an example, the result for the additional HC emissions under the same conditions is 25 mg per mile at a permissible limit value of 96 mg per mile. As already elaborated upon, these values can be reduced by further optimizing the duration of the post-injection as well as the pulse shape of the post-injection. Moreover, it seems to be advantageous to carry out the method while concurrently performing exhaust gas recirculation (EGR). The EGR rate lowers the oxygen content in the raw exhaust gas of the engine, as a result of which the characteristic value rises. In this manner as well, the additional fuel consumption as well as the HC emissions caused by it can be reduced.

Figure 9A:
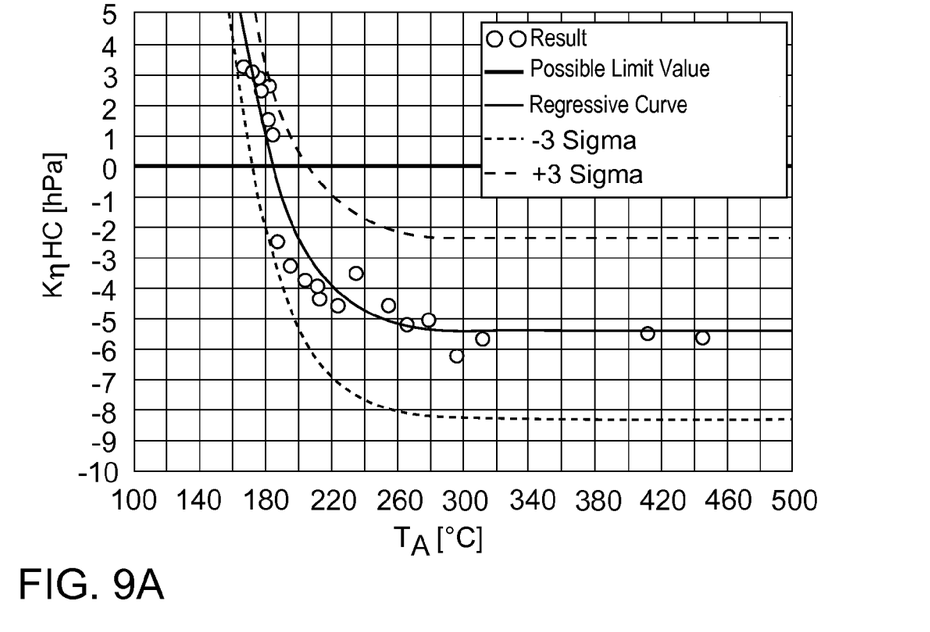
FIGS. 9A and B: the curve of the characteristic value ascertained according to the invention for the HC-conversion efficiency as well as the theoretically expected curve as a function of the exhaust gas temperature downstream from the oxidation catalyst, measured with an $NO_x$ sensor (A) downstream from the particulate filter, and (B) downstream from the SCR catalyst.
Figure 9B:
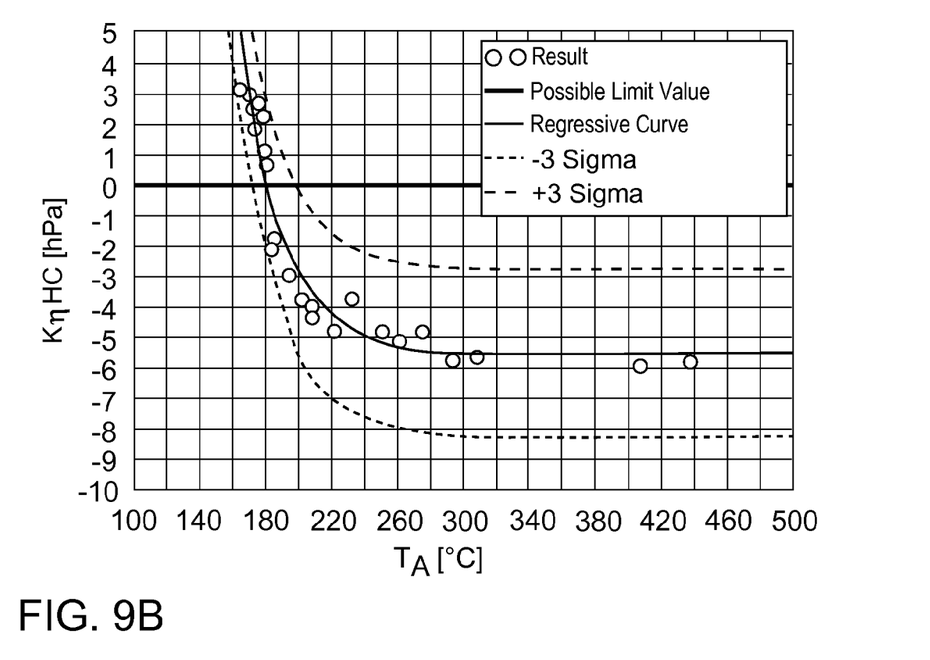

In another experiment, it was examined whether the place of measurement of the oxygen partial pressure detected downstream from the oxidation catalyst has an influence on the outcome of the conversion characteristic value. In this experiment, the duration of the late post-injection was 8 seconds. The following were evaluated: on the one hand, the broadband lambda signal of the broadband lambda probe 30 downstream from the diesel particulate filter 22 according to the system shown in FIG. 1 and, on the other hand, the broadband lambda signal of the $NO_x$ sensor 32 located downstream from the SCR catalyst 24, 26. The results are presented in FIGS. 9A and 9B. It can be seen that the diesel particulate filter 22 is the major contributor to the time delay of the signal. In contrast, the signal delay caused by the undercarriage SCR catalyst 24, 26 is negligible. The scatter of the measured values as compared to the theoretical curve, in contrast, is comparable for both measurement sites. Thus, it appears to be largely immaterial where the broadband lambda signal value is detected in the exhaust gas channel downstream from the oxidation catalyst.

LIST OF REFERENCE NUMERALS

10 motor vehicle
12 internal combustion engine
14 exhaust gas system
16 exhaust gas channel
18 exhaust gas turbine (turbocharger)
20 oxidation catalyst
22 particulate filter
24 first SCR catalyst
26 second SCR catalyst
28 first broadband lambda probe
30 second broadband lambda probe
32 $NO_x$ sensor
34 temperature sensor
36 diagnostic device
300 broadband lambda probe
302 wall
304 exhaust gas
306 ambient air
308 base structure/$O^{2-}$ dielectric material
310 cavity
312 diffusion barrier
314 internal pump electrode
316 external pump electrode
318 Nernst electrode
320 reference electrode
400 logical operating diagram
402 first subtractor
404 timer
406 second subtractor
500 late post-injected amount
502 oxygen partial pressure upstream from the oxidation catalyst ($p_{O2\_}\lambda 1$)
504 oxygen partial pressure downstream from the oxidation catalyst ($p_{O2}\lambda 3$)
506 differential oxygen partial pressure upstream and downstream from the oxidation catalyst ($\Delta p_{O2}$)
508 exhaust gas temperature downstream from the oxidation catalyst ($T_A$)

The invention claimed is:

1. A method to determine an HC-conversion efficiency of a catalyst, wherein said catalyst is situated in an exhaust gas flow path of an internal combustion engine and is configured to convert hydrocarbons (HC) in exhaust gas, said efficiency being determined via a first oxygen-sensitive sensor having a cross sensitivity to hydrocarbons and being installed downstream from the catalyst in the exhaust gas flow path, and a second such oxygen-sensitive sensor installed upstream from the catalyst, said method comprising the steps of:

using the downstream sensor, detecting a first signal ($\lambda 2(t1)$) at a first point in time (t1), wherein the exhaust gas upstream from the catalyst comprises a first HC fraction;

using the downstream sensor, detecting a second signal ($\lambda 2(t2)$) at a second point in time (t2), wherein the exhaust gas upstream from the catalyst comprises a second HC fraction that is higher than the first HC fraction;

using the upstream sensor, detecting a first signal ($\lambda 1(t1)$) at the first point in time and a second signal ($\lambda 1(t2)$) at the second point in time (t2), forming a first differential signal ($\Delta\lambda(t1)$) between the first signal ($\lambda 2(t1)$) of the downstream sensor and the first signal ($\lambda 1(t1)$) of the upstream sensor, forming a second differential signal ($\Delta\lambda(t2)$) between the second signal ($\lambda 2(t2)$) of the downstream sensor and the second signal ($\lambda 1(t2)$) of the upstream sensor, and determining the HC-conversion efficiency of the catalyst as a function of the first and second differential signals ($\Delta\lambda(t1)$, ($\Delta\lambda(t2)$), and providing an indication if the HC-conversion efficiency is below a predetermined value.

2. The method according to claim 1, wherein the HC-conversion efficiency of the catalyst is determined as a function of the difference between the first signal ($\lambda 2(t1)$) and the second signal ($\lambda 2(t2)$) of the downstream sensor.

3. The method according to claim 1, wherein an oxygen content in the exhaust gas upstream from the catalyst at the first point in time (t1) corresponds to an oxygen content in the exhaust gas at the second point in time (t2).

4. The method according to claim 1, wherein the HC-conversion efficiency of the catalyst is determined as a function of the difference ($\Delta\lambda$) between the first differential signal ($\Delta\lambda(t1)$) and the second differential signal ($\Delta\lambda(t2)$).

5. The method according to claim 1, wherein an elevated HC fraction in the exhaust gas upstream from the catalyst at the second point in time (t2) is created by at least one active measure leading to a deterioration of engine efficiency and to increased HC raw emissions involving trimming of the points in time of the injection of fuel or trimming of the ignition points in time.

6. The method according to claim 1, whereby the elevated HC fraction in the exhaust gas upstream from the catalyst at the second point in time (t2) is present because of a corresponding operating point of the internal combustion engine.

7. The method according to claim 1, whereby the oxygen-sensitive sensor is a broadband lambda probe or an NOx sensor.

8. The method according to claim 1 further comprising providing said catalyst in an exhaust gas flow path of the internal combustion engine and providing the oxygen-sensitive sensor in the exhaust gas flow path downstream from the catalyst.

9. The method according to claim 1, wherein HC-conversion efficiency below the predetermined value indicates a deterioration of the catalyst such that a vehicle having said catalyst in its internal combustion engine would likely exceed a predetermined emission value.

10. The method according to claim 1, whereby the method is carried out when the catalyst temperature lies within a given temperature range of 170° C. to 350° C. [338° F. to 662° F.].

11. The method according to claim 10, whereby the method is carried out when the catalyst temperature lies within a given temperature range of 200° C. to 300° C. [392° F. to 572° F.].

12. In an internal combustion engine having a catalyst which is situated in an exhaust gas flow path of the engine and which is configured to convert hydrocarbons (HC) in the exhaust gas, a diagnostic device that is configured to determine the HC-conversion efficiency of the catalyst, the diagnostic device comprising:

a first oxygen-sensitive sensor having a cross sensitivity to hydrocarbons and being installed downstream from the catalyst in the exhaust gas flow path; and a second oxygen-sensitive sensor having a cross sensitivity to hydrocarbons and being installed upstream from the catalyst in the exhaust gas flow path, wherein the diagnostic device is configured to use the downstream sensor to detect a first signal ($\lambda 2(t1)$) at a first point in time (t1) wherein the exhaust gas upstream from the catalyst comprises a first HC fraction;

use the downstream sensor to detect a second signal ($\lambda 2(t2)$) at a second point in time (t2) wherein the exhaust gas upstream from the catalyst comprises a second HC fraction that is higher than the first HC fraction; and use the upstream sensor to detect a first signal ($\lambda 1(t1)$) at the first point in time and a second signal ($\lambda 1(t2)$) at the second point in time (t2), form a first differential signal ($\Delta\lambda(t1)$) between the first signal ($\lambda 2(t1)$) of the downstream sensor and the first signal ($\lambda 1(t1)$) of the upstream sensor, form a second differential signal ($\Delta\lambda(t2)$) between the second signal ($\lambda 2(t2)$) of the downstream sensor and the second signal ($\lambda 1(t2)$) of the upstream sensor, determine the HC-conversion efficiency of the catalyst as a function of the first and second differential signals ($\Delta\lambda(t1)$), ($\Delta\lambda(t2)$), and provide an indication if the HC-conversion efficiency is below a predetermined value.

13. A motor vehicle comprising a diagnostic device according to claim 12.

* * * * *